(12) United States Patent
Gardner et al.

(10) Patent No.: US 8,119,280 B2
(45) Date of Patent: Feb. 21, 2012

(54) CAP ASSEMBLY FOR A HIGH CURRENT CAPACITY ENERGY DELIVERY DEVICE

(75) Inventors: William H. Gardner, East Freetown, MA (US); Donald G. Dafoe, Marlborough, MA (US); Lucien Fontaine, Lincoln, RI (US)

(73) Assignee: A123 Systems, Inc., Waltham, MA (US)

(*) Notice: Subject to any disclaimer, the term of this patent is extended or adjusted under 35 U.S.C. 154(b) by 907 days.

(21) Appl. No.: 12/135,708

(22) Filed: Jun. 9, 2008

(65) Prior Publication Data
US 2009/0004559 A1 Jan. 1, 2009

Related U.S. Application Data

(60) Provisional application No. 60/933,813, filed on Jun. 7, 2007, provisional application No. 60/933,757, filed on Jun. 8, 2007, provisional application No. 60/951,571, filed on Jul. 24, 2007.

(51) Int. Cl.
*H01M 2/00* (2006.01)
*H01M 6/00* (2006.01)
*B23K 26/20* (2006.01)
*B23K 11/00* (2006.01)

(52) U.S. Cl. ............. 429/163; 219/117.1; 219/121.64; 29/623.1

(58) Field of Classification Search ................. None
See application file for complete search history.

(56) References Cited

U.S. PATENT DOCUMENTS

| | | | | |
|---|---|---|---|---|
| 3,486,940 A | * | 12/1969 | Samuel | 429/82 |
| 6,117,586 A | | 9/2000 | Kim et al. | |
| 6,399,242 B2 | * | 6/2002 | Kitoh et al. | 429/164 |
| 7,175,936 B2 | | 2/2007 | Kawamura et al. | |
| 2001/0049054 A1 | * | 12/2001 | Enomoto et al. | 429/158 |

FOREIGN PATENT DOCUMENTS

JP 11102688 A 4/1999

OTHER PUBLICATIONS

International Search Report and Written Opinion for PCT Application No. PCT/US2008/066338 mailed Oct. 31, 2008. 5 pages.

* cited by examiner

*Primary Examiner* — Krishnan S Menon
(74) *Attorney, Agent, or Firm* — Wilmer Cutler Pickering Hale and Dorr LLP (57) ABSTRACT

A cap assembly for use in an electrochemical cell. The cap assembly includes a tab collection post, a core insert, and at least one current collecting tab connected at one end to an electrode foil in the electrochemical cell, and horizontally connected at the other end to the tab collection post and the core insert. The at least one current collecting tab is disposed between and welded with the tab collection post and the core insert. The cap assembly also includes a shock absorber disposed around the core insert.

14 Claims, 13 Drawing Sheets

CAP ASSEMBLY FOR A HIGH CURRENT CAPACITY ENERGY DELIVERY DEVICE

CROSS REFERENCE TO RELATED APPLICATIONS

This application claims priority from U.S. Provisional Patent Application No. 60/933,813, filed on Jun. 7, 2007, and U.S. Provisional Patent Application No. 60/933,757, filed on Jun. 8, 2007, which are hereby incorporated by reference herein in their entireties. This application is also related to U.S. Provisional Patent Application No. 60/951,571, filed on Jul. 24, 2007, which is hereby incorporated by reference herein in its entirety.

FIELD OF THE INVENTION

Exemplary embodiments consistent with the present invention generally relate to an energy delivery device, and more particularly, to a cap assembly of the energy delivery device.

BACKGROUND

In an energy delivery device (e.g., a battery cell), electric current is carried from a battery electrode foil to a centrally located terminal. The electrode foil can be directly connected to the central terminal, or it can be connected to the central terminal through a current collecting tab (e.g., a thin strip of metal). In some conventional energy delivery devices, the orientation of the plane of the foil or tab at the location in which it connects to the central terminal largely coincides with the longitudinal axis of the cell. Employing such a vertical connection requires considerable vertical space in the cell.

Figure 1:
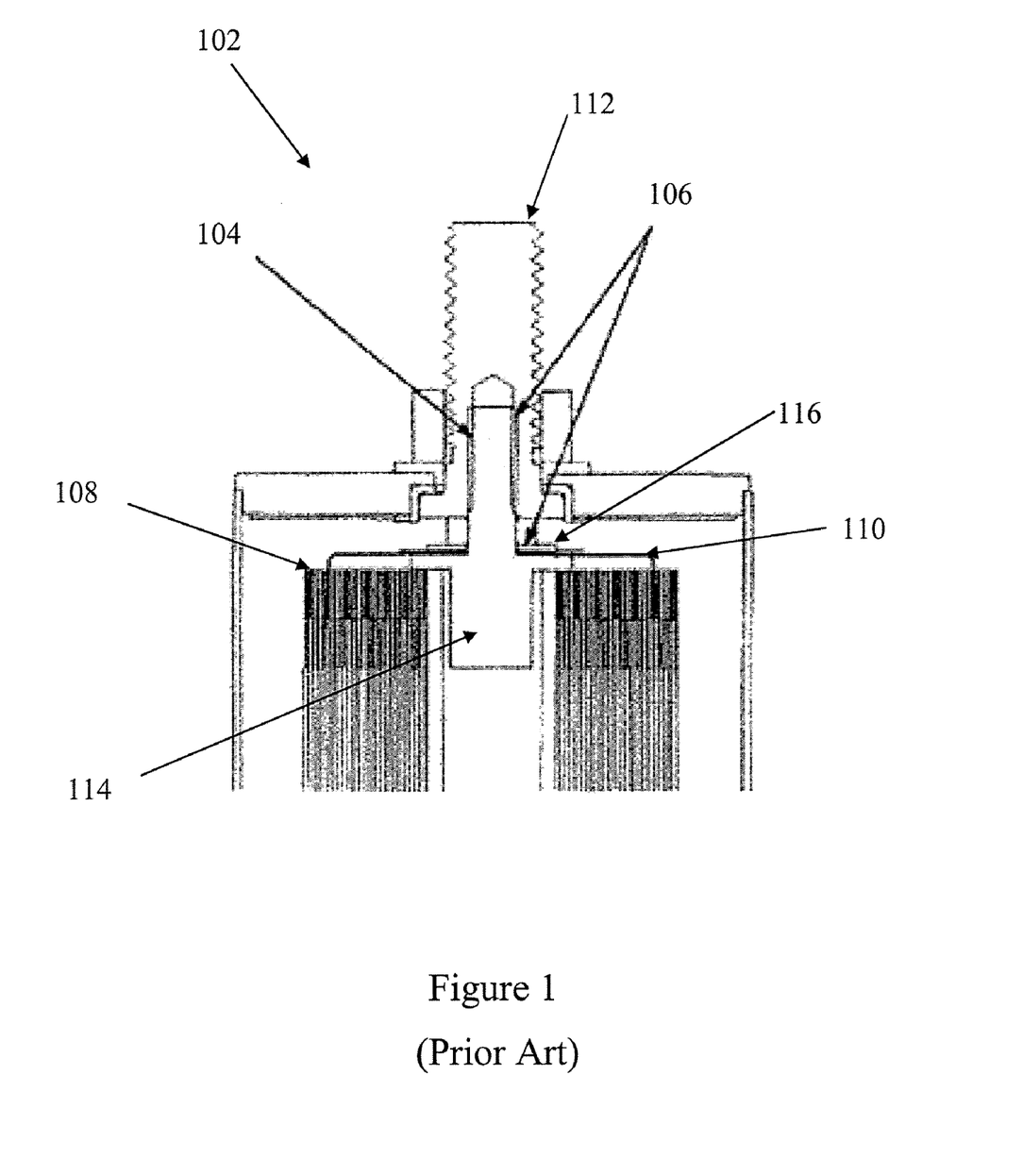
FIG. 1 shows a prior art battery design.

Other conventional energy delivery devices use a horizontal tab connection. FIG. 1 illustrates such a device 102. In device 102, tabs 110 are connected to electrode 108 at the lower end, and are connected to a central terminal 114 at the upper end. The central terminal 114 has a protruding post 104 that is connected to a bolt 112. The tabs 110 have holes (not shown) at the upper end and the protruding post 104 protrudes through the holes. During assembly, the upper ends of the tabs 110 are stretched over to the top of the post 104 and then pressed down with the post 104 passing though the holes. This requires the lengths of the tabs 110 to reach from the points of connection with electrode 108 to the top of the post 104, which are longer than the horizontal distances between the points of connection with electrode 108 and the center of the cell 102. Cell 102 also suffers from high electrical impedance because current coming out of the electrode 108 passes through mechanical connections 106. For example, the connection between the post 104 and the bolt 112 is a threaded connection. The tabs 110 are connected to the terminal 114 at the bottom of the post 104 by placing a nut 116 on top of the tabs 110. These mechanical connections 106 tend to have high impedance. Some conventional cells have multiple components through which current must be conducted, which adds impedance.

Therefore, it is desirable to employ a low impedance cap assembly that is space efficient and does not require an extra tab length.

SUMMARY OF EXEMPLARY, NON-LIMITING EMBODIMENTS OF THE INVENTION

Exemplary embodiments of the invention provide a cap assembly for use in an electrochemical cell including a tab collection post; a core insert; and at least one current collecting tab. The current collecting tab is connected at one end to an electrode foil in an electrochemical cell, and horizontally oriented so as to be connected at another end to the tab collection post and the core insert. The current collecting tab is disposed in a welded engagement with the tab collection post and the core insert, such that the tab collection post and the core insert are coupled by the at least one current collecting tab. A rivet may be provided that is electrically connected with the tab collection post, and a lid can be coupled with the rivet. The tab collection post may have a pin that is extended through a hole in the current collecting tab and has a portion disposed within a hole of the core insert. In addition, a shock absorber can be disposed around the core insert In accordance with an aspect of the invention, the rivet has a welded engagement with the tab collection post. Likewise, the at least one current collecting tab may be welded, such as in a laser weld engagement, with the tab collection post and in a resistance weld engagement with the core insert, for example.

In accordance with another aspect of the invention, a method for manufacturing an electrochemical cell is provided, including installing a core insert in an electrochemical cell, folding a first end of at least one current collecting tab toward the core insert and providing the current collecting tab to be connected to an electrode of the electrochemical cell at a second end. The method further includes disposing a tab collection post on top of the current collecting tab and the core insert; welding the tab collection post with the current collecting tab and the core insert; and disposing a cap subassembly to cover the electrochemical cell. The cap subassembly may include a rivet, such that welding the rivet with the tab collecting post forms an electrical connection. The welding of the tab collection post, the current collecting tab, and the core insert may include laser welding or resistance welding.

BRIEF DESCRIPTION OF THE DRAWINGS

Exemplary embodiments of the invention are described with reference to the following figures, which are provided for the purpose of illustration only, the full scope of the invention being set forth in the claims that follow.

DETAILED DESCRIPTION OF EXEMPLARY, NON-LIMITING EMBODIMENTS OF THE INVENTION

Aspects of the present invention provide low impedance and space efficient cap assemblies for battery cells. According to various embodiments, a cap assembly includes current collecting tabs that are connected horizontally (i.e., planes of the tabs at the location in which they connect to each other and to the central terminal are perpendicular to the longitudinal axis of the battery cell) and are disposed between a tab collection post and a core insert. The tabs can be welded with the tab collection post and/or the core insert to reduce electrical impedance of the cell.

Figure 2A:
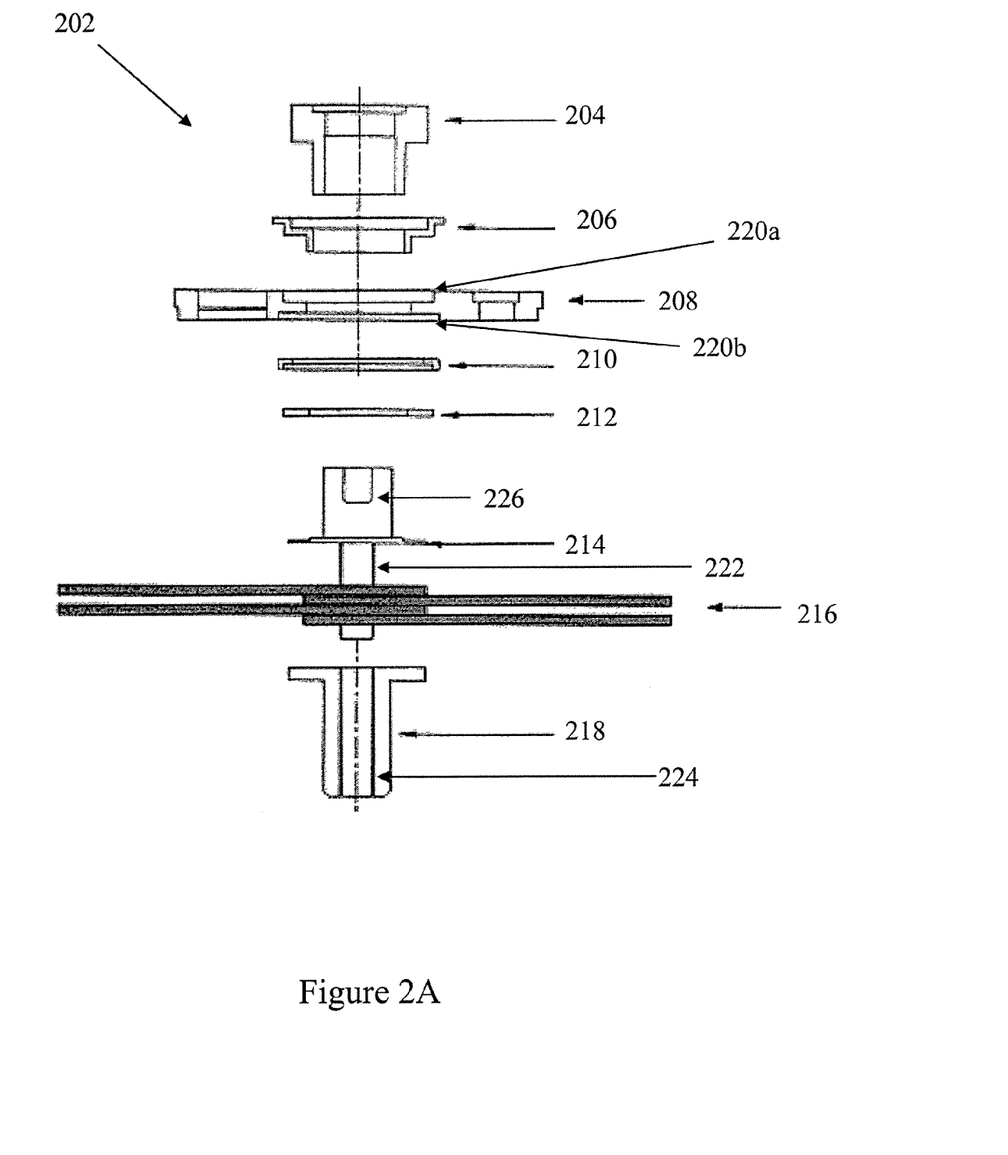
FIG. 2A is a cross-sectional view illustrating the components of a cap assembly according to an exemplary embodiment of the present invention.

FIG. 2A is a cross-sectional view illustrating various components of a cap assembly 202. The cap assembly 202 is used to collect electric currents from an electrode (or electrodes) of a battery cell and to deliver electric currents to external devices. The cap assembly 202 can include a rivet 204 or other similar fastening means, an upper seal 206, a lid 208, a lower gasket 210, and a washer 212. The cap assembly 202 can also include a tab collection post 214, current collection tabs 216, and a core insert 218.

The rivet 204 is used for sending electricity to external devices. It can be made of an electrically and thermally conductive material that is compatible with the electrochemistry of the cell. Typical materials of construction include, for example, copper, carbon steel, nickel plated carbon steel, stainless steel, nickel, and beryllium copper when used at the anode potential of a lithium ion cell. When used at the cathode potential of a lithium ion cell, typical materials are aluminum or aluminum alloy, titanium, molybdenum or stainless steel. The lower portion of the rivet 204 can be inserted through the upper seal 206, the lid 208, the lower gasket 210, and the washer 212 to connect with the tab collection post 214. The rivet 204 can be made hollow so that the upper portion of the tab collection post 214 can be fitted inside the rivet 204 and electrically connect with the rivet 204.

The upper seal 206 is electrically insulated and resilient. It is compressed between the rivet 204 and the lid 208 during assembly and serves the functions of both providing a leak proof seal and electrical insulation between the rivet 204 and the lid 208. The upper seal can be constructed with melt processable polymers such as PFA (perfluoroalkoxy), PP (polypropylene), PE (polyethylene), TPI (thermoplastic polyimide), or PE/PP blends, or any other suitable materials.

The lid 208 can be fixed to the cell casing, typically through welding, and functions to hold the rest of the cap assembly in place. It can be made of aluminum, aluminum alloy, or other metals such as stainless steel or nickel plated carbon steel. It can also be made of rigid polymers, reinforced polymers, or any other suitable material. The lid 208 can have an upper recess 220a and a lower recess 220b. The upper section of the rivet 204 can fit within the upper recess 220a, and the upper section of the upper gasket 210 can fit within the lower recess 220b. The upper recess 220a and the lower recess 220b can be square in shape (as well as the upper sections of the rivet 204 and the upper gasket 210) to prevent rotation of the rivet 204 and the upper gasket 210. However, the recesses 220a and 220b need not be square for this purpose; hexagonal, triangular, oval, or other non-round geometries can also prevent rotation.

The lower gasket 210 has the function of insulating the lid 208 from unwanted electrical contact with other internal components such as tabs 216. It also prevents electrolyte from making an electrical path between the lid 208 and the rivet 204. The washer 212 is used to provide a springing force and to maintain a compression on the seal 206. The washer 212 is rigid and can be made from a metal or hardened metal that is appropriately compatible with the electrochemistry at the potential at which it is held. Such materials include but are not limited to steel, nickel plated steel, stainless steel, titanium, and molybdenum.

The tab collection post 214 is used for carrying electrical current from the tabs 216 to the outside of the cell. Because it can be made very short in accordance with aspects of the invention, and relatively large in cross-sectional area and can be made of low resistivity material, it creates a very low impedance path for electrical current to move out of the cell. A threaded hole 226 can be provided in the top portion of the tab collection post 214 to allow an external mechanical connection.

The current collecting tabs 216 provide a means of carrying current from the electrode foil in the battery cell (e.g. a jelly roll electrochemical cell) to the tab collection post 214. Each of the tabs 216 is connected at one end to an electrode in the cell, and connected at the other end to tab collection post 214. The tabs 216 can be horizontally connected to each other and to the tab collection post 214. The horizontal connection requires little vertical space within the cell, making the cell space efficient.

The core insert 218 is a part that can be inserted into a core of the cell (not shown) to provide a platform on which to weld tabs 216 together and to accept the tab collection post 214. The core insert 218 is a feature that is included to facilitate resistance welding of the tabs 216 and may not be required when other joining methods such as ultrasonic welding of the tabs are employed. In some embodiments, the core insert 218 may be a disc-shaped platform to support tabs 216 during welding and does not protrude into the core.

Figure 3A:
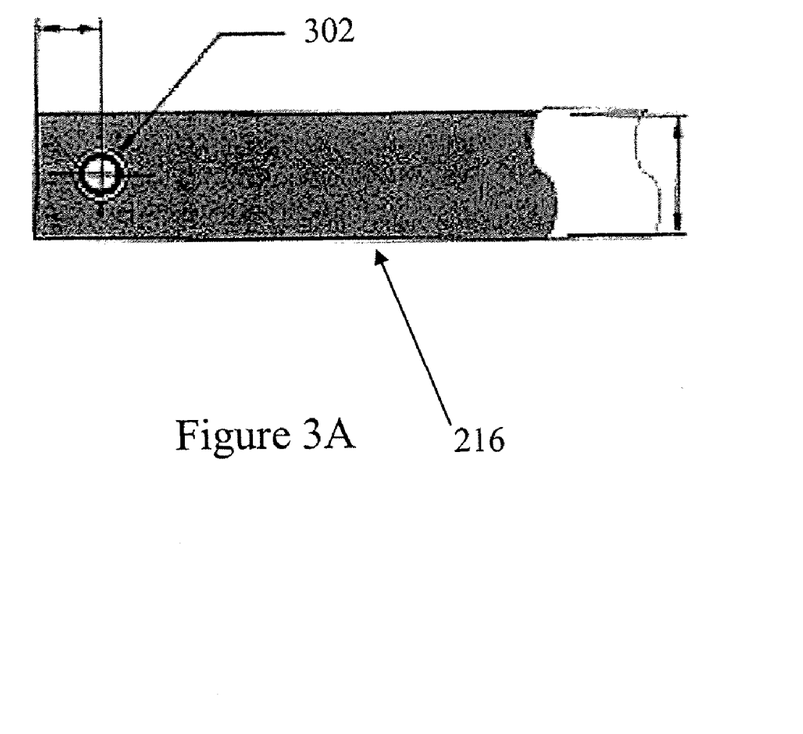
FIG. 3A is a top view of a current collecting tab used in a cap assembly according to an exemplary embodiment.

In one embodiment which is shown in FIG. 2A, post 214 has a pin 222 protruding from its lower surface to facilitate manual assembly and location of the tabs 216. In this embodiment, the tabs 216 have holes 302 as shown in FIG. 3A. The core insert 218 also has a hole 224. The pin 222 protrudes through the tab holes 302 and the hole 224 of the core insert 218. This facilitates manual assembly and location of the tabs 216. The tabs 216 may be, for example, 6 mm to 12 mm wide, and 0.03 mm to 0.2 mm thick. The holes 302 can, for example, have a diameter of 3 mm, and be located 5 mm away from the edge of the tabs 216.

Tabs 216 can be individually welded together as they are folded onto the core insert 218. In some embodiments, tabs 216 can be welded with the bottom surface of tab collection post 214 using, for example, laser welding, and with the top surface of the core insert 218 using, for example, resistance welding. In some embodiments, tabs 216, tab collection post 214, and core insert 218 are all welded together using laser welding. Because the connections between the tabs 216 and the tab collection post 214 are formed by welding, the electrical impedance of these connections are low as compared with impedance of mechanical connections such as threaded connections. In addition, the tab lengths are reduced as compared with the prior art design shown in FIG. 1, because the tabs 216 do not need to be stretch over to the top of a vertical post.

Figure 2B:
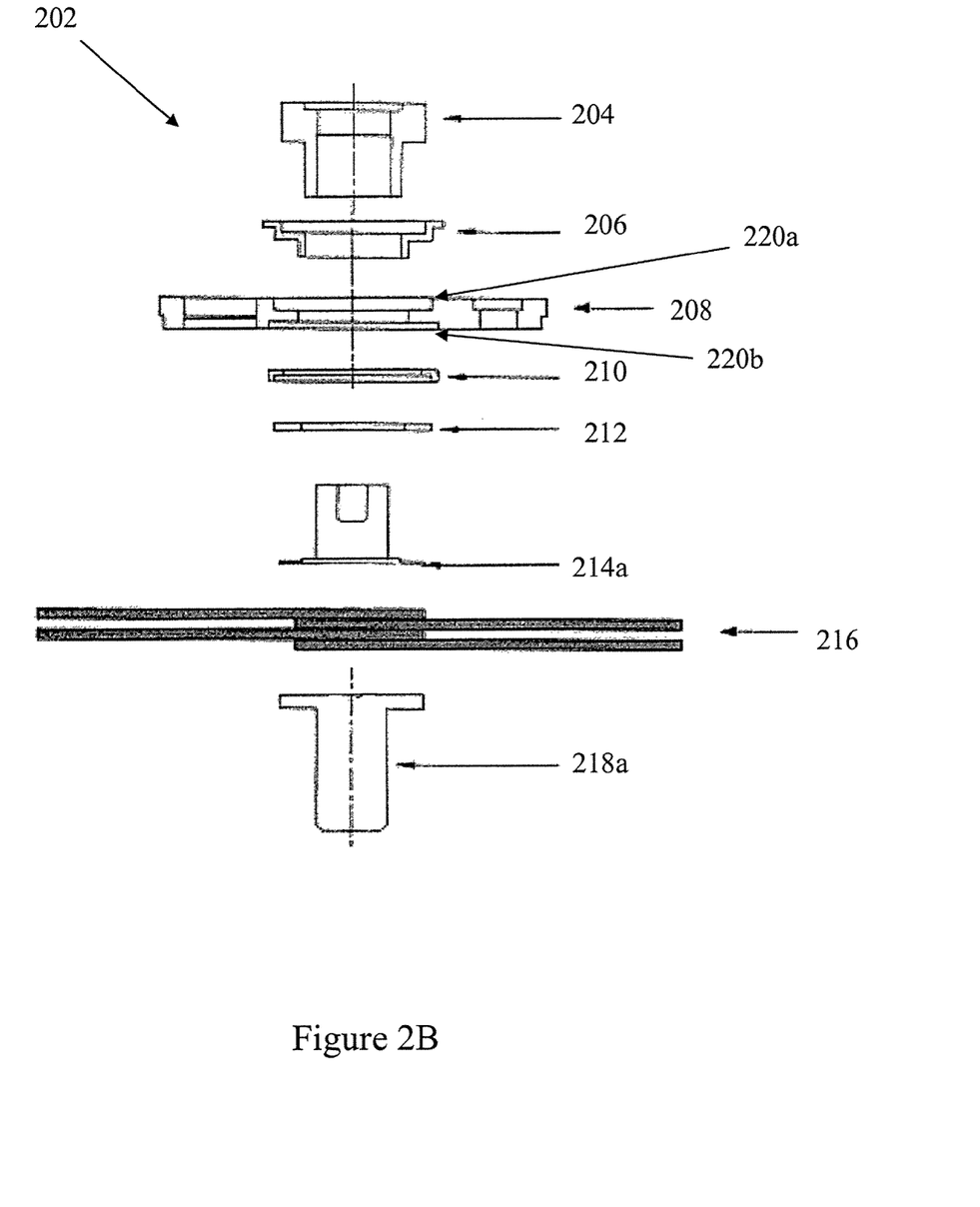
FIG. 2B is a cross-sectional view illustrating the components of a cap assembly according to another exemplary embodiment of the present invention.

In an alternative embodiment shown in FIG. 2B, the tab collection post 214a does not have a pin, and there are no holes in the tabs 216 and the core insert 218a. In this embodiment, the current collecting tabs 216 are also secured between the tab collection post 214a and the core insert 218a by welding the tabs 216 together with the tab collection post 214a and the core insert 218a.

Once the tab collection post 214 is fitted inside the rivet 204, these two components can also be welded together to provide a low impedance electrical connection. The rivet 204, the tab collection post 214, or both can be fabricated by an alloy of copper, such as phosphor bronze, e.g., C51000 (95% Cu, 5% Sn, trace P) rather than pure copper. Copper is desirable because of its very low electrical resistivity, however it has proven difficult to reliably create a hermetic laser seam weld between copper and copper. Laser seam welding is preferred for the connection between the rivet and tab collection post because this method concentrates energy locally and minimizes the increase in temperature of the surrounding parts as compared to alternative welding processes such as GTAW which might be used to create such a weld. The addition of a small amount of Sn and a trace amount of P have shown promise in changing the properties of the material enough such that hermetic laser welding can be reliably conducted. Although Sn readily alloys with Li when held at the anode potential in a lithium ion cell, experimentation has shown that when Sn in the alloy is held below approximately 5%, the alloy is stable when held at the anode potential in a lithium ion cell, making the alloy a viable choice. Added advantages of phosphor bronze (or similar alloys) are that they are not as susceptible to atmospheric corrosion as carbon steel, and their resistivity is significantly lower than carbon steel. While their resistivity is lower than that of carbon steel, it is significantly higher than that of aluminum or aluminum alloy or pure copper, making the alloys more easily joined to external cell components such as bus bars and circuit boards by resistance welding.

Figure 3B:
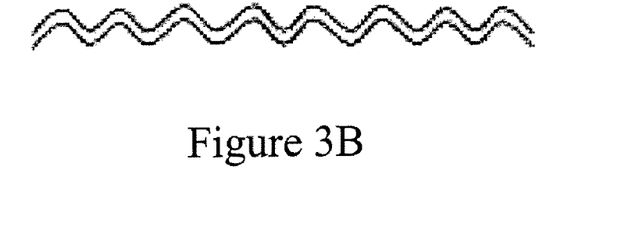
FIG. 3B is a side view of a current collecting tab according to an exemplary embodiment.

A pad of material with higher resistivity than aluminum, such as (but not limited to) nickel plated steel, nickel, carbon steel, stainless steel, brass, bronze, or similar alloys can be joined to an aluminum or aluminum alloy rivet in a position outside of the cell. Joining of these materials can be through soldering, brazing, ultrasonic welding, laser welding, or other similar and known metal to metal joining techniques. The advantage of producing a cell with a pad of higher resistivity material joined to the aluminum or aluminum alloy is that it more readily facilitates being joined to by resistance welding. This pad of material can also be made of a bimetallic material in which one of the components of the bimetallic material is aluminum or aluminum alloy and the other material is one of the previously mentioned higher resistivity materials. Bimetallic materials are commonly manufactured with cladding processes in which high pressure is employed to permanently and metallurgically join two layers of dissimilar materials without the use of significant heat. A typical bimetal pad could be 0.5 mm thick copper or copper alloy clad to 0.5 mm thick aluminum or aluminum alloy, forming a pad with a total thickness of 1 mm. These are simply suggested thicknesses as a wide range of thicknesses could be successfully employed, and other embodiments may use alternative dimensions. By employing aluminum or aluminum alloy as one of the constituents of the bimetal pad, joining to the aluminum or aluminum alloy rivet through such commonly practiced techniques as laser welding is facilitated. And the necessity of employing joining methods such as brazing and soldering as mentioned above are eliminated In a cell, the tabs 216 are often stressed due to vibrations and shock loads. To reduce this stress, tabs 216 can be corrugated as shown in FIG. 3B or otherwise modified. Corrugation reduces the stiffness of the tabs 216 along its length by several orders of magnitude and correspondingly reduces stress on welds to electrode foil during shock and vibration conditions. Tabs 216 can also be extension tabs as commonly used in the industry as a means of making an electrical connection between a jelly roll and a cap assembly prior to installation of the cap assembly onto the cell can (not shown).

Figure 4:
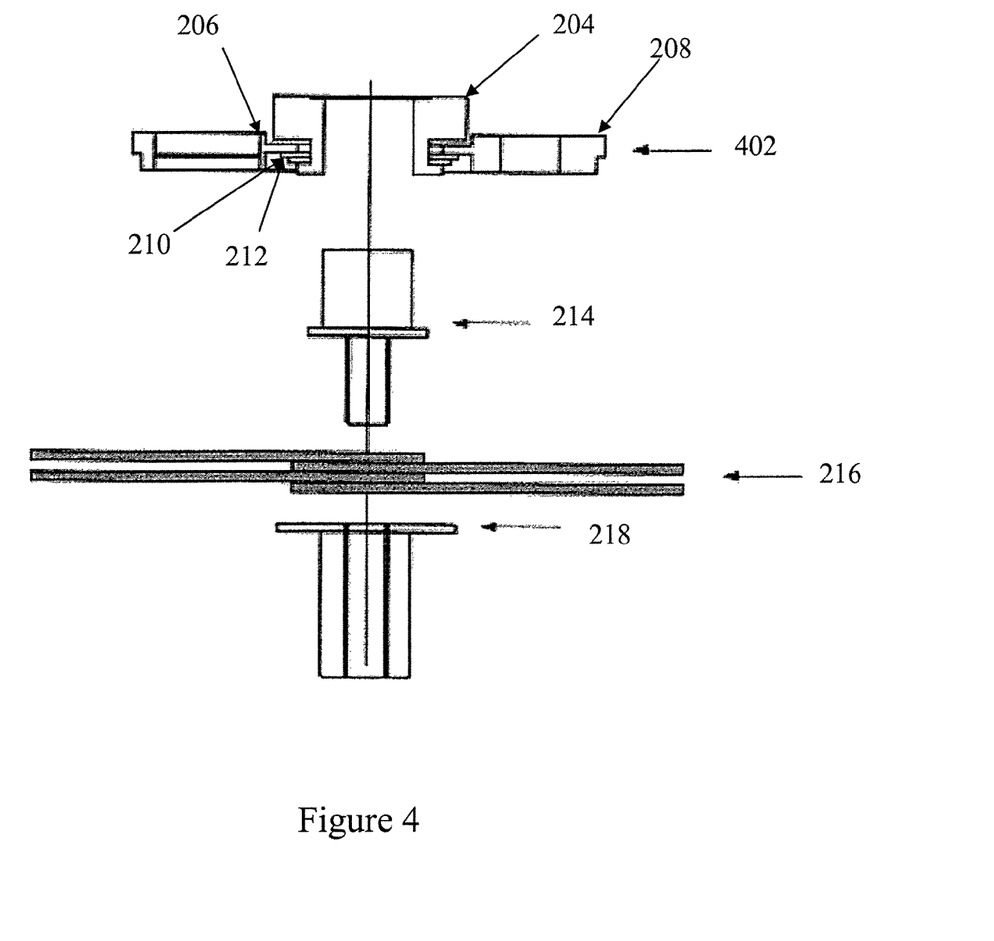
FIG. 4 is a cross-sectional view of various components of a cap assembly according to an exemplary embodiment.

FIG. 4 is another cross-sectional view illustrating the various components of a cap assembly. In FIG. 4, the rivet 204, the upper seal 206, the lid 208, the lower gasket 210, and the washer 212 have been assembled into a cap/rivet subassembly 402. The rivet 204 in the subassembly 402 is hollow so that tab collection post 214 can be fitted within subassembly 402. Once fitted, the rivet 204 in the subassembly 402 can be welded with the tab collection post 214 to form a low impedance electrical connection.

Figure 5A:
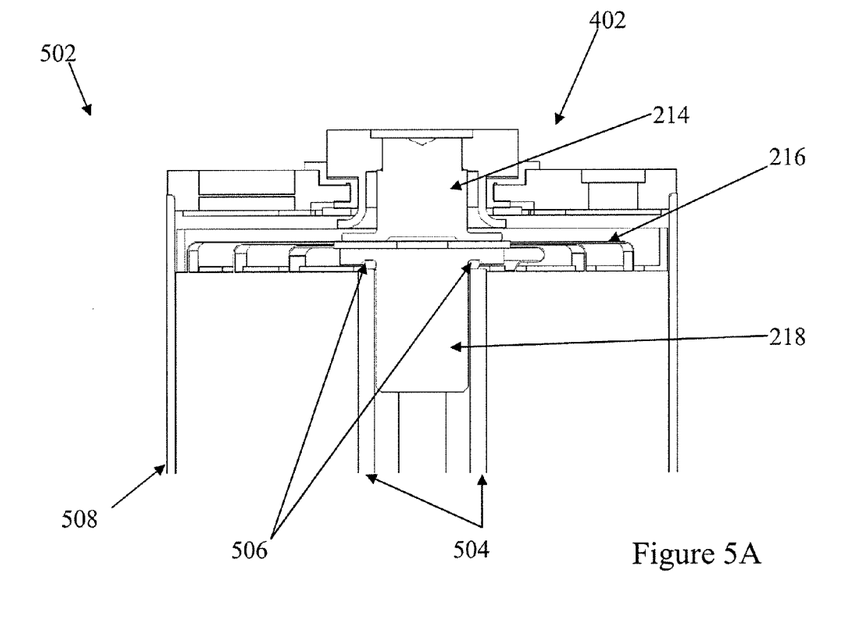
FIG. 5A is a cross-sectional view of a portion of a cell using a cap assembly according to an exemplary embodiment.

FIG. 5A is a cross-sectional view of the upper portion of a cell 502 using a cap assembly according to another exemplary embodiment of the present invention. As shown, the tab collection post 214, the tabs 216, and the core insert 218 have been assembled together with the cap/rivet subassembly 402 to form a complete cap assembly that covers the cell can 508. At the center of the cell 502 is a core 504, into which the core insert 218 is inserted. A ring-shaped shock absorber 506 is disposed around the core insert 218 and between the core 504 and the core insert 218. In FIG. 5A, only an upper portion of the cell 502 is shown. The lower portion of the cell 502 (not shown) can have substantially the same cap assembly structure as in the upper portion.

The shock absorber 506 allows increased manufacturing tolerances by flexibly filling space between the core 504 and the cap assembly and reducing the magnitude of force transmitted to the electrodes (e.g., electrodes rolled into a jelly roll) during shock and vibration loading. The shock absorber 506 is made from a resilient material, such as ethylene propylene diene monomer (EPDM) rubber, Kalrez (Dupont), or butyl rubber elastomer.

Figure 5B:
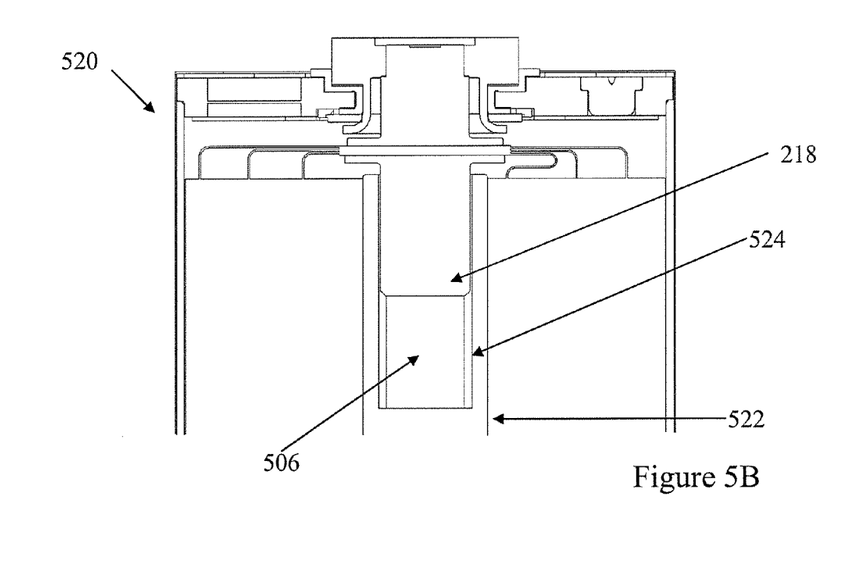
FIG. 5B is a cross-sectional view of a portion of a cell using a cap assembly, the cell having a solid core.

The core 504 supports the axial forces imparted onto the shock absorber 506. The core 504 can be made of a material that has a coefficient of thermal expansion similar to that of the can material. The core 504 can be made of an electrically insulating material, a conductive material that is coated with electrically insulating material, or a multi-part assembly including some electrically insulating components, so that the core insert 218 and a core insert in the lower portion of the cell (not shown) are insulated from each other. The core may or may not be hollow. FIG. 5B illustrates a cell 520 that has a primarily solid core 522 with small cavities 524 at its ends. In this embodiment, a shock absorber 506 can be placed within the cavity 524 between the innermost surface of the core insert 218 and the surface of the core 522 closest to the surface of the core insert 218.

The size and deflection of the shock absorber 506 can be minimized. Battery cans are often made of aluminum or aluminum alloy because of its relatively low density. However, aluminum or aluminum alloy has a relatively large coefficient of thermal expansion. To minimize deflection in the shock absorber 506, the coefficient of thermal expansion of the core 504 should be very close to that of the battery can 508. In some embodiments, this is achieved by incorporating in the core 504 a portion of short glass fibers into a polymer material and orienting those fibers primarily in the longitudinal direction of the core 504. In one embodiment, a PBT (polybutyleneterephthlate) resin filled with 30% short glass fiber (SABIC Plastics Valox 420) is used to achieve approximately the same coefficient of thermal expansion as the 3003 alloy aluminum can. By purposefully designing the mold cavity in which the part is produced, the glass fibers can be oriented primarily in the longitudinal direction of the core and the desired coefficient of thermal expansion can be achieved.

Figure 6:
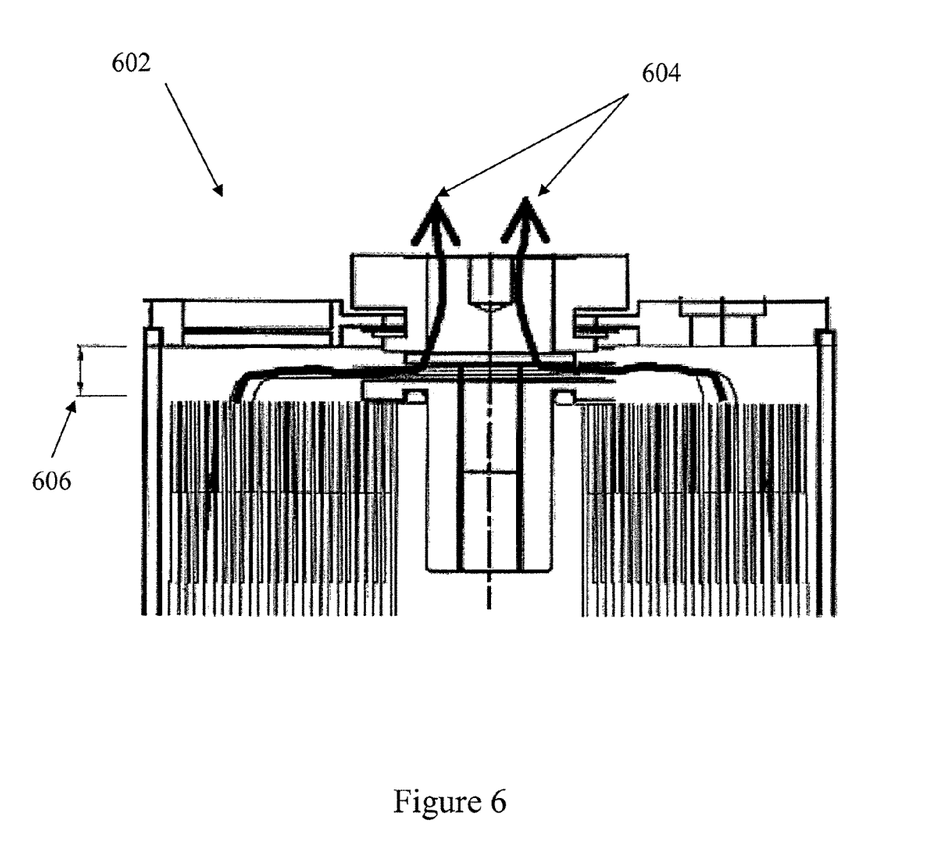
FIG. 6 is another cross-sectional view of a portion of a cell using a cap assembly according to an exemplary embodiment.

FIG. 6 is another cross-sectional view of a portion of a cell 602 using a cap assembly. Arrows 604 shows the paths of electrical currents. As shown, the vertical space 606 required by the tabs is relatively small.

Figures 7A, 7B:
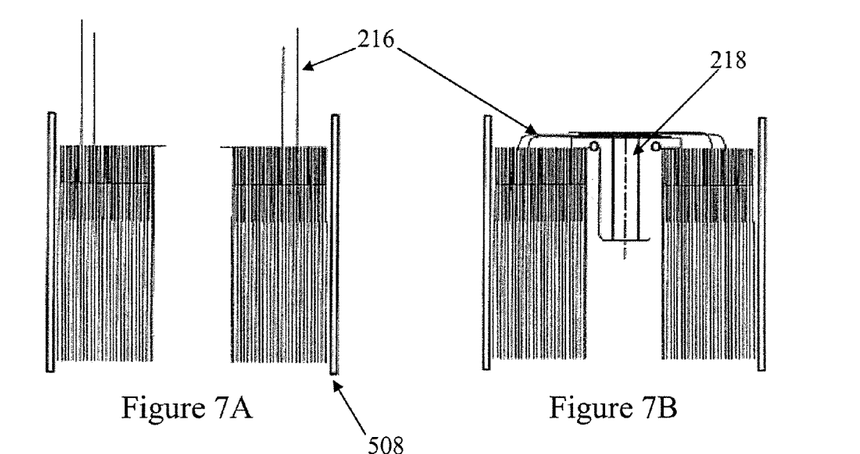
FIG. 7A is a cross-sectional view of a portion of a cell illustrating a first step for assembling a cell according to an exemplary embodiment.
FIG. 7B is a cross-sectional view of a portion of a cell illustrating a second step for assembling a cell according to an exemplary embodiment.
Figure 7C:
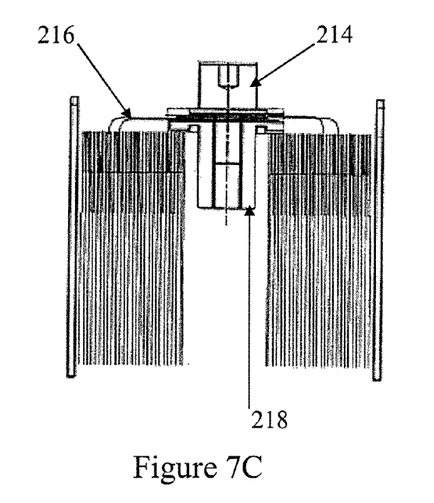
FIG. 7C is a cross-sectional view of a portion of a cell illustrating a third step for assembling a cell according to an exemplary embodiment.
Figure 7D:
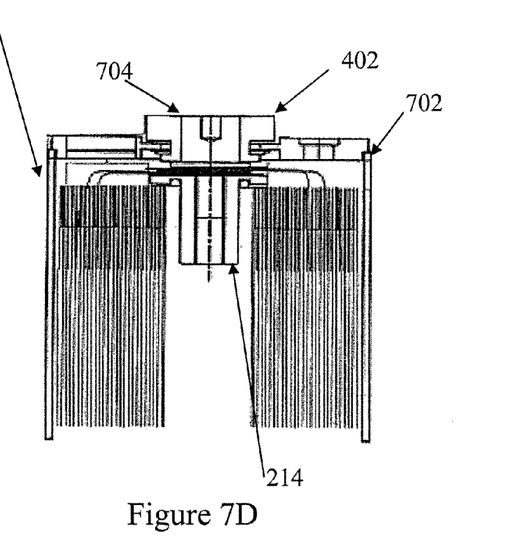
FIG. 7D is a cross-sectional view of a portion of a cell illustrating a fourth step for assembling a cell according to an exemplary embodiment.

FIGS. 7A-7D illustrate the steps for manufacturing a cell using a cap assembly according to various embodiments as described above. FIG. 7A shows a jelly roll battery with a cell can 508 and axially protruding tabs 216 before assembly. In the next step shown in FIG. 7B, a core insert 218 is installed, and the tabs 216 are folded toward the core insert 218 and welded with the core insert 218. In the next step shown in FIG. 7C, a tab collection post 214 is assembled with the tabs 216 and the core insert 218. The flange of the post 214 is welded with the tabs and/or the core insert 218. In the last step shown in FIG. 7D, a cap/rivet subassembly 402 is lowered onto the cell, with tab collection post 214 fitted within the hollow center of the subassembly 402, and the edge of the subassembly 402 fitted on top of the cell can 508. The subassembly 402 can then be welded with the tab collection post 214 at the location pointed to by arrow 704 to form an electrical connection with the post 214. The subassembly 402 is also welded with the cell can 508 at the location pointed to by arrow 702 to seal the battery cell.

Figure 8A:
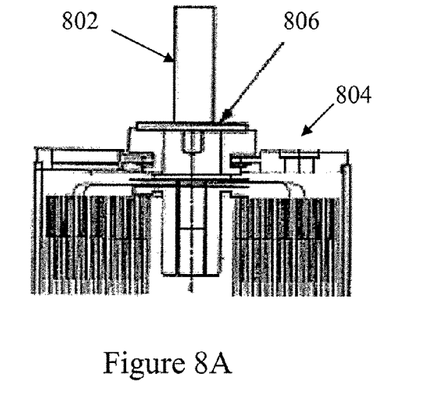
FIG. 8A is a cross-sectional view of a portion of a cell having a welded vertical terminal stud.
Figure 8B:
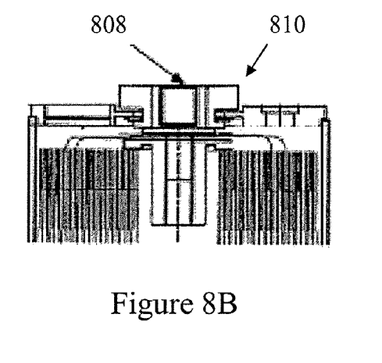
FIG. 8B is a cross-sectional view of a portion of a cell having a cap assembly with a threaded hole at the center.
Figure 8C:
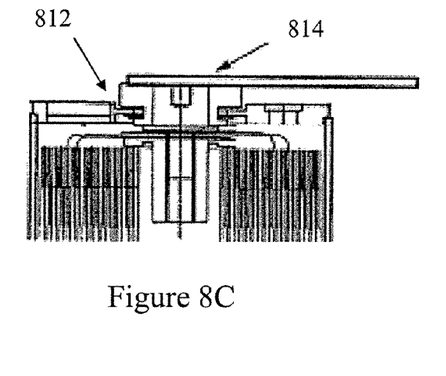
FIG. 8C is a cross-sectional view of a portion of a cell having a welded horizontal terminal strap.
Figure 8D:
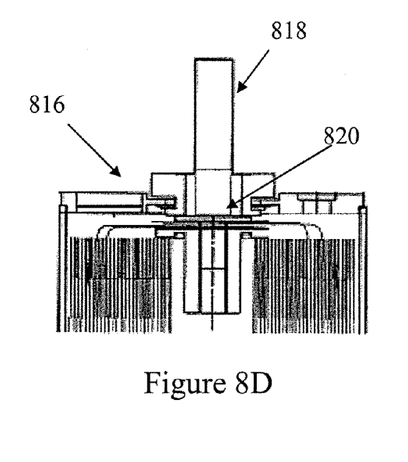
FIG. 8D is a cross-sectional view of a portion of a cell having a vertical terminal stud integral to a tab collection post.

FIGS. 8A-8D are diagrams illustrating different ways of interconnecting cap assemblies according to various embodiments. FIG. 8A shows a cap assembly 804 welded with a vertically disposed terminal stud 802 at location 806. The terminal stud 802 can be threaded for forming a threaded connection. The terminal stud 802 can then connect with other battery cells or devices, through for example, a threaded connection. FIG. 8B shows a cap assembly 810 with a threaded hole 808 at its center. The threaded hole can be used to connect with a terminal stud for example (not shown) by a threaded connection. FIG. 8C shows a cap assembly 812 welded with a horizontally disposed terminal strap 814. The strap 814 can be used to connect with other cells or devices. FIG. 8D shows a cap assembly 816 having a vertical terminal stud 818 that is an integral part of a tab collection post 820 within the cap assembly 816. Terminal stud 818 can then connect with other batteries or devices through, for example, a threaded connection.

Figure 9:
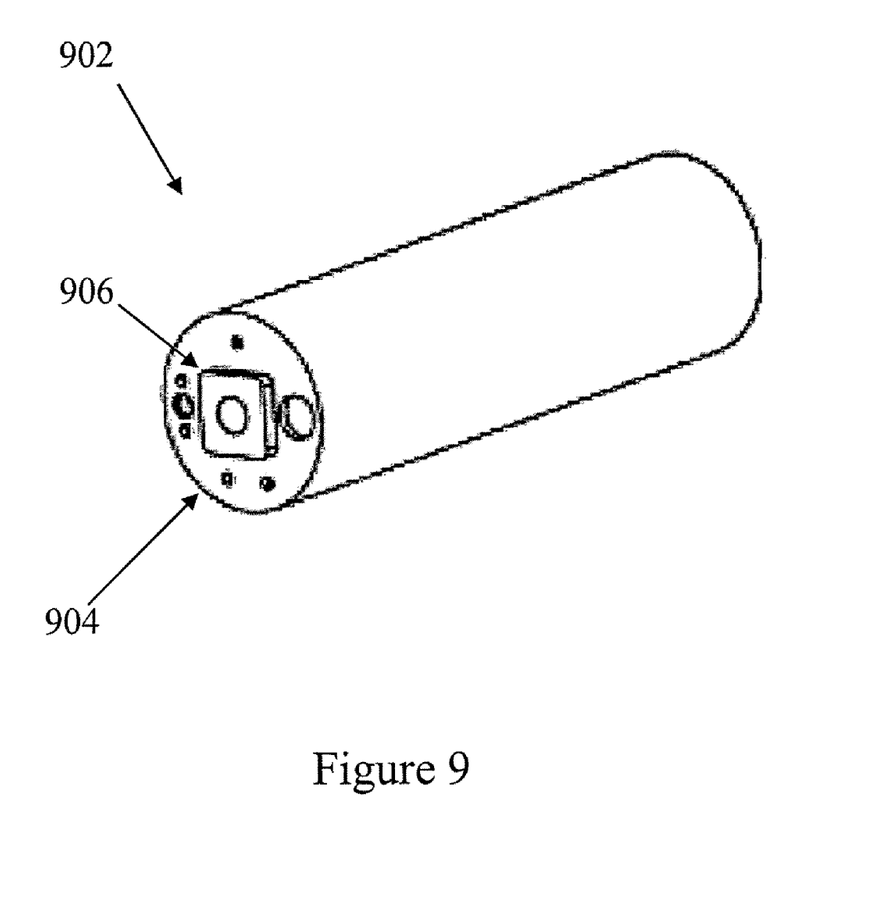
FIG. 9 is a perspective view of a cell having a cap assembly according to one exemplary embodiment.
Figure 10A:
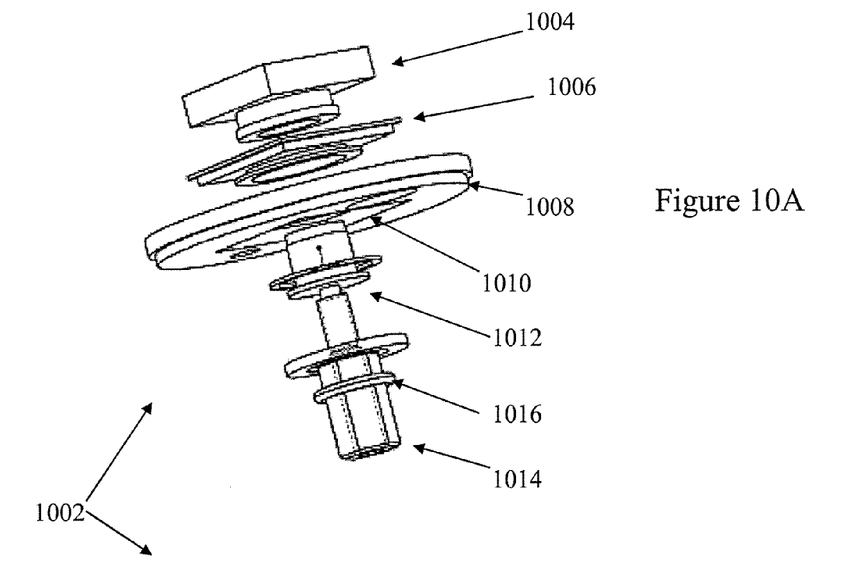
FIG. 10A is a perspective view of components of a cap assembly according to one exemplary embodiment.
Figure 10B:
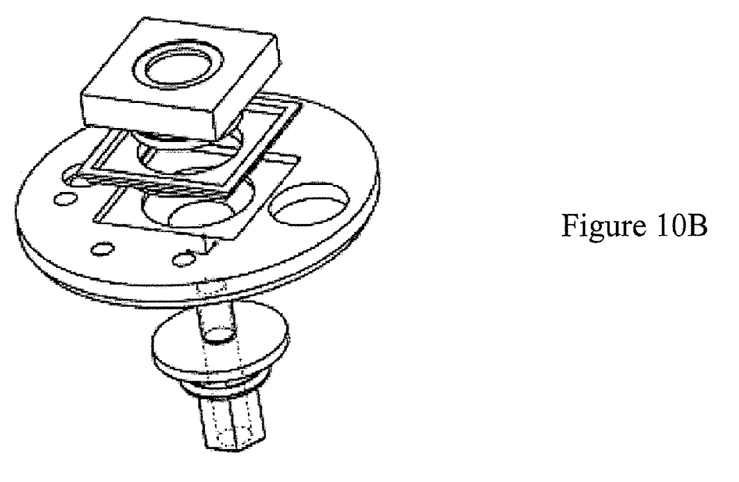
FIG. 10B is another perspective view of components of a cap assembly according to one exemplary embodiment.

FIG. 9 is a perspective view of a cell 902 having a cap assembly 904 according to one exemplary embodiment. In this example, the cap assembly 904 has a square-shaped rivet 906 at its center. FIGS. 10A and 10B are perspective views of components of a cap assembly 1002 according to another exemplary embodiment. Among other components, cap assembly 1002 has a rivet 1004 with a square upper portion, an upper seal 1006, and a lid 1008 with a square recess 1010 within which the rivet 1004 can be fitted. The cap assembly 1002 also includes a tab collection post 1012 and a core insert 1014. A ring-shaped shock absorber 1016 is disposed around the core insert 1014.

Figure 11A:
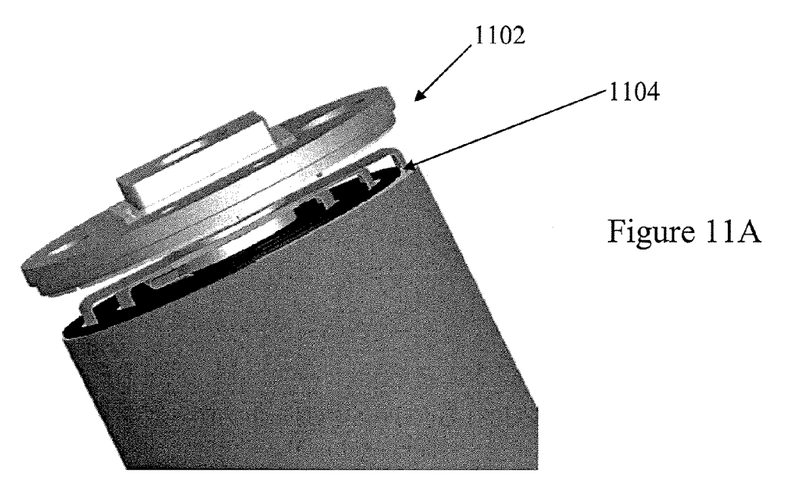
FIG. 11A is a perspective view of a battery having a cap assembly with a stamped insulator.
Figure 11B:
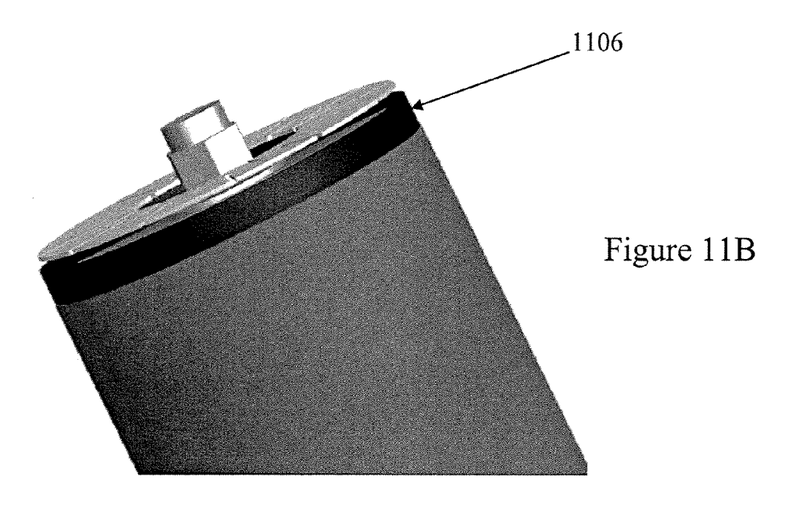
FIG. 11B is a perspective view of a battery having a cap assembly with a molded insulator.

FIG. 11A is a perspective view of a battery having a cap assembly 1102 with a stamped insulator. FIG. 11B is a perspective view of a battery having a molded insulator 1106. Various insulator designs shown in FIGS. 11A and 11B are disclosed in U.S. Patent Application U.S. Provisional Patent Application No. 60/951,571, entitled "Battery Cell Design and Methods of Its Construction," which is hereby incorporated in its entirety. The insulators provide protection from internal cell shorting by providing a barrier between the tabs and the electrode edges. The advantage of a molded insulator is the added protection of a barrier between the tabs and the cell can wall.

Figure 12:
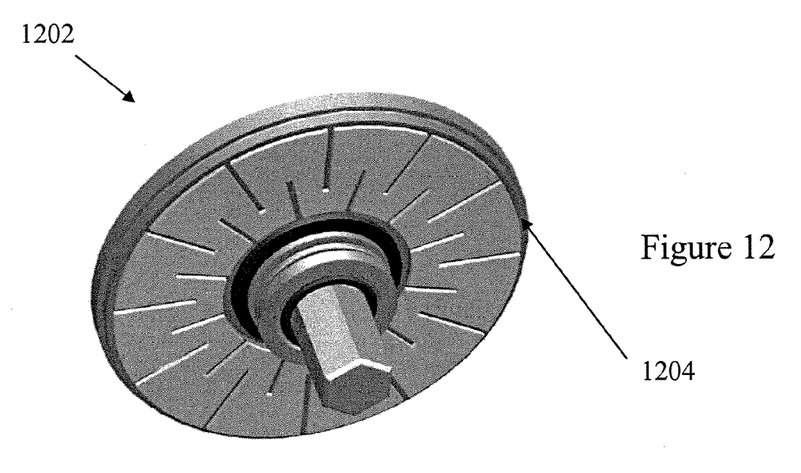
FIG. 12 is a perspective view of a cap assembly having a slotted insulator.

FIG. 12 is a perspective view of a cap assembly 1202 having a slotted insulator 1204. The slotted insulator provides protection against shorting between the tabs and the cap/rivet subassembly of the cap assembly 1202. The insulator is slotted to allow gas to escape through a vent located in the cap assembly during abuse conditions and to facilitate the introduction of electrolyte during the filling process in cell assembly.

In the present invention, it should be noted that the different components of a cap assembly (e.g. rivets, tab collection posts, core inserts, tabs, etc.) can be made of multiple materials and joined with multiple welding methods. Welding techniques include but are not limited to ultrasonic welding, resistance welding, and laser welding. Different welding techniques can be employed at different connections in the cap assembly.

Numerous additional advantages or modifications may be realized by those having ordinary skill in the art. Accordingly, it is intended that the invention not be limited to the disclosed non-limiting embodiments but be interpreted within the full spirit and scope of the appended claims.

The invention claimed is:

1. A cap assembly for use in an electrochemical cell, comprising:
   a tab collection post;
   a core insert;
   at least one current collecting tab to be connected at one end to an electrode foil in an electrochemical cell, and horizontally oriented so as to be connected at another end to the tab collection post and the core insert, the current collecting tab disposed in a welded engagement with the tab collection post and the core insert, such that the tab collection post and the core insert are coupled by the at least one current collecting tab; and
   a shock absorber to be disposed between the core insert and a central core of the electrochemical cell.

2. The cap assembly of claim 1, further comprising,
   a rivet electrically connected with the tab collection post; and
   a lid coupled with the rivet.

3. The cap assembly of claim 2, wherein the rivet has a welded engagement with the tab collection post.

4. The cap assembly of claim 2, wherein the tab collection post is electrically connected to a power terminal for external electrical connection.

5. The cap assembly of claim 2, wherein the tab collection post has a threaded portion that protrudes into an opening of the rivet for external electrical connection.

6. The cap assembly of claim 1, wherein the tab collection post has a pin that is extended through a hole in the current collecting tab and has a portion disposed within a hole of the core insert.

7. The cap assembly of claim 1, wherein the current collecting tab has a laser weld engagement with the tab collection post and the core insert.

8. The cap assembly of claim 1, wherein the at least one current collecting tab has a laser weld engagement with the tab collection post and a resistance weld engagement with the core insert.

9. The cap assembly of claim 1, wherein the at least one current collecting tab is corrugated.

10. An electrochemical cell comprising the cap assembly of claim 1, electrode foils, the central core, and a cell can.

11. The electrochemical cell of claim 10, wherein the cell is a lithium ion jelly roll cell.

12. The electrochemical cell of claim 10, further comprising an insulator that provides a barrier to the at least one current collecting tab.

13. The electrochemical cell of claim 10, wherein the cap assembly further comprises a lid, and the cell further comprising a slotted insulator that provides a barrier between the current collecting tab and the lid.

14. The electrochemical cell of claim 10, wherein the central core is made of a first material and the cell can is made of a second material, the first and the second materials having similar coefficients of thermal expansion.

\* \* \* \* \*